United States Patent [19]

Poirier

[11] Patent Number: 4,930,758
[45] Date of Patent: Jun. 5, 1990

[54] SUPPORT ELEMENT WITH MOVEMENT LIMITER, IN PARTICULAR FOR MOTOR VEHICLE ENGINES

[75] Inventor: Jean Poirier, Chateaudun, France
[73] Assignee: Hutchinson, France
[21] Appl. No.: 316,709
[22] Filed: Feb. 28, 1989
[30] Foreign Application Priority Data
Feb. 29, 1988 [FR] France ................. 88 02468
[51] Int. Cl.[5] ............ F16F 13/00; F16F 1/36; B60G 11/22
[52] U.S. Cl. ................. 269/292; 267/140.5; 267/153; 267/141.1
[58] Field of Search ............ 267/292, 293, 294, 153, 267/152, 140.5-141.6; 180/300; 248/573, 562, 636, 632

[56] References Cited
U.S. PATENT DOCUMENTS

| | | | |
|---|---|---|---|
| 2,154,586 | 4/1939 | Stern | 267/141.1 X |
| 3,288,405 | 11/1966 | Johnson | 267/153 X |
| 3,430,901 | 3/1969 | Cauvil | 248/573 |
| 4,214,738 | 7/1980 | Casper | 267/141.1 |
| 4,252,301 | 2/1981 | Saito | 267/141.5 |
| 4,418,898 | 12/1983 | Atsumi et al. | 267/153 X |
| 4,770,398 | 9/1988 | Lee | 267/153 X |

FOREIGN PATENT DOCUMENTS

| | | | |
|---|---|---|---|
| 0076580 | 6/1977 | Japan | 267/153 |
| 0266248 | 11/1987 | Japan | 267/140.5 |
| 0274123 | 11/1987 | Japan | 267/153 |

Primary Examiner—Douglas C. Butler
Attorney, Agent, or Firm—Larson and Taylor

[57] ABSTRACT

Support element with movement limiter is provided, in particular for motor vehicle engines, of the type comprising a resilient support (1) with a device (7, 8) for fixing both to the body of the vehicle and to the engine, and a movement limiter (2) also fixed to the body and comprising two flanges (13, 14) enclosing the resilient support () and adapted for limiting the forward and rearward movement thereof, characterized in that it further comprises a closure cross-brace (17) providing a rigid connection between the ends of the flanges (13, 14) of the limiter.

1 Claim, 2 Drawing Sheets

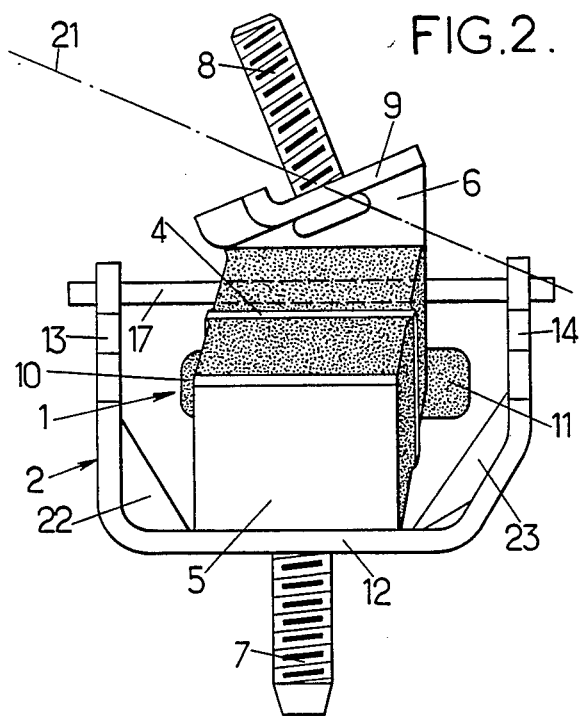
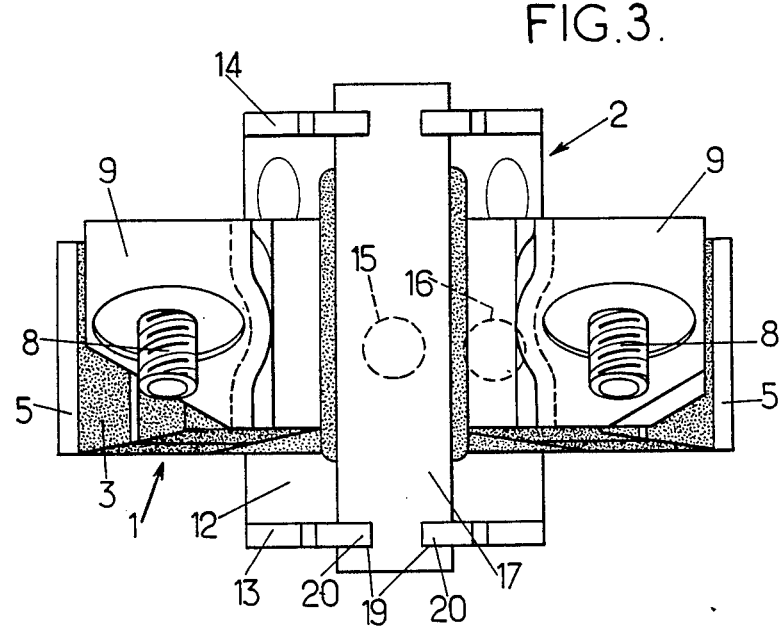

SUPPORT ELEMENT WITH MOVEMENT LIMITER, IN PARTICULAR FOR MOTOR VEHICLE ENGINES

The present invention relates a support element with movement limiter, in particular for motor vehicle engines, of the type comprising:

(a) a resilient support with means for fixing to the body of the vehicle and to the engine, and (b) a movement limiter also fixed to the body and comprising two flanges enclosing said resilient support and adapted for limiting the forward and rearward movements thereof.

In presently known support elements of this type, the limiter is made in one piece and is formed of a pressed metal sheet whose profile is open, namely which has a cross section in the general form of a U, the bottom of this U being fixed to the body of the vehicle.

During accelerations to which the engine is subjected, forwards or rearwards, with respect to the body of the vehicle, one of the two resilient stops which the resilient support comprises, at the front and at the rear, comes into abutment on the inner face of the corresponding flange of the limiter, which limits the free movement of the support and prevents it from taking an exaggerated amplitude in one direction or in the other.

As for the opening of the cross section of the limiter, its purpose is to introduce the resilient support therein during fitting: positioning remains however difficult, it must be carried out manually and there exists a risk of losing the support or partial disengagement thereof with respect to its normal position in the limiter, during handling of the mounted support elements. This has the serious drawback that if such partial disengagement is unnoticed by the fitter, the suspension of the engine will be defective.

Such opening of the cross section of the limiter, required for fitting, has another drawback in that, when the resilient support abuts against the inner face of one of the flanges of the limiter, only this flange is subjected to the forces due to movement of the engine. The result is that it is necessary to use very thick metal sheet, with in addition flanges of relatively large area. To avoid deformation of the limiter, it is further advisable to reinforce it at the bends between its bottom and the flanges, by reinforcement ribs or embossings.

These arrangements of course increase the cost price of the support elements.

The purpose of the invention is to overcome these drawbacks of known support elements.

For this, a support element in accordance with the invention, of the general type defined at the beginning, is characterized in that it further comprises a closure cross-brace providing a rigid connection between the ends of said flanges of the limiter.

The metal sheet from which the limiter is pressed may thus be appreciably thinner than that of known limiters, since the forces exerted on a flange of the limiter because of the abutment of the corresponding stop of the resilient support, will be transmitted simultaneously to the other flange by the cross-brace. In other words, the mechanical stiffness of the limiter is increased in the direction of the forces exerted by the engine, while reducing the expense in raw materials, with simplified cross-brace machining since it may be formed of a simple flat bar.

Other features and advantages of the invention will be clear from reading the following description of one embodiment of a support element, given by way of simple example, with reference to the accompanying figures in which:

FIG. 2 is a profile view of this element; and

FIG. 3 is a top view of this element.

Figure 1:
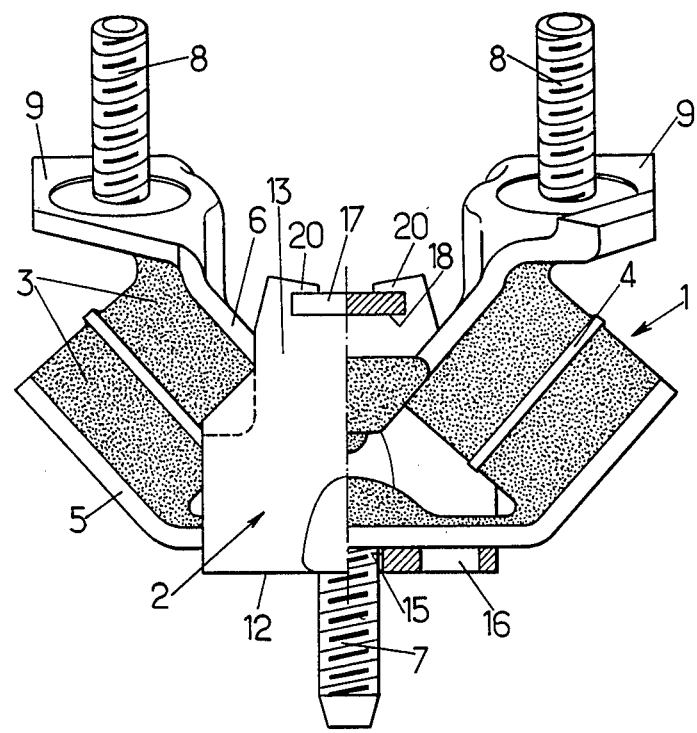
FIG. 1 is a front elevational view of a support element in accordance with the invention.

In the different figures, the resilient support has been referenced 1 and the movement limiter 2. The resilient support 1 is formed of two elastomer blocks 3 separated by a plate 4 and adhered between a lower frame 5 and an upper frame 6, both being made from bent metal sheet.

The lower frame 5 may be fixed to the body of a vehicle by means of a screw 7 welded to this frame, and the upper frame 6 may be fixed to the engine, providing suspension thereof, by means of two screws 8 welded to bent and slanting lugs 9.

In FIG. 2, it can be further seen that the resilient support 1 comprises a front stop 10 and a rear stop 11. The vehicle engine extends to the left of this figure and the passenger cabin to the right, assuming the engine at the front.

As for the movement limiter 2, it is formed of a metal sheet bent in the form of a U, comprising a bottom 12 and two flanges, front and rear, 13 and 14. The bottom 12 is formed with a hole 15 for passing the fixing screw 7 therethrough and a hole 16 receiving a positioning pin, these two holes being cylindrical.

In known support elements of the kind mentioned above, the resilient support 1 is held in position in the movement limiter by two lugs bent horizontally towards each other and extending from the middle of the upper edge of the two flanges such as 13 and 14. Fitting of the resilient support is made difficult by the presence of these lugs and must be done manually it cannot be robotized. Furthermore, as was mentioned above, holding the support in position is not perfect and it risks being moved and even lost during handling. In addition, during such manual fitting, the resilient support must be slid under the two lugs at the same time as its fixing screw 7 must be introduced into the hole in the bottom 12 of the limiter. This is why this hole must be oblong, which complicates machining, wastes material and weakens this bottom of the device.

With the invention, on the contrary, the flanges 13 and 14 of the limiter have no lugs, which greatly facilitates fitting of the resilient support : such fitting may be readily robotized, because it can be carried out by simply lowering the resilient support 1 vertically between the flanges 13 and 14 of the limiter, its screw 7 penetrating directly into hole 15 of bottom 12; this is why, as mentioned above, holes 15 and 16 may be cylindrical.

Under such conditions, the holding lugs of known devices are replaced in accordance with the invention by a cross-brace 17 which closes the U profile of the limiter 2 and connects the ends of the two flanges 13 and 14 rigidly together.

Advantageously, this cross-brace 17 is formed of a simple flat cut bar, whose shape can be seen in FIG. 3. The feasibility of the limiter is thus greater than that of known limiters.

The ends of the cross-brace bar 17 are crimped on the respective ends of flanges 13 and 14 of the movement limiter 2. For this, these ends of flanges 13 and 14 each comprises two legs turned towards each other 20, forming a mortise 18 whose shape can be seen in figure the corresponding end of the cross-brace 17 comprising two facing notches 19, visible in FIG. 3, making it possible for the ends of cross-brace 17 to be introduced into these mortises 18. Crimping is then carried out, after such introduction (the resilient support 1 being at that time compressed vertically), by pressing the two legs 20 of flanges 13 and 14 towards each other, which imprisons the cross-brace and consequently prevents any untimely disengagement or any movement of the resilient support 1 in the limiter 2.

It can be further seen, particularly from FIG. 2, that this cross-brace 17 will transmit from one flange to the other of limiter 2, the forces due to abutment of stops 10 and 11 respectively on flange 13 or on flange 14, following deformation of the resilient support 1 due to acceleration of the engine (which occurs along line 21 in one direction or the other). Thus it is possible to use, for forming the limiter by pressing, a metal sheet which is appreciably thinner than in known limiters, with a reduced width of flanges 13 and 14, whence a not inconsiderable saving of material.

It should be finally noted that reinforcement of the limiter at the bending lines between bottom 12 and flanges 13 and 14 may be lightened, again with respect to known limiters. A single reinforcement embossing 22, 23, preventing opening out, is required on each side.

I claim:

1. Support element with a movement limiter, made of a two-piece sheet metal construction, in particular for motor vehicle engines, of the type comprising:
   (a) a resilient support with means for fixing it to both the body of the vehicle and the engine, and
   (b) a movement limiter having an open U shape comprising a bottom to which are connected two flanges, thus allowing the positioning of said resilient support between said flanges, said movement limiter being fixed to the body by its bottom so as to limit the forward and rearward movements of said resilient support, these movements being produced respectively by the braking or acceleration of said vehicle, said support comprising a closure cross-brace providing a rigid connection between the ends of said flanges of the limiter, so as to transmit the acceleration and braking forces from one of said flanges to the other, thus avoiding the need for reinforcements of the metal sheet between said flanges and said bottom, wherein said crossbrace is formed by a metallic cut bar whose ends are crimped on the respective ends of the flanges of the movement limiter and wherein the ends of the flanges of the movement limiter each comprise two legs turned towards each other and forming a mortise, the corresponding end of the cross-brace comprising two facing notches, for introducing it into the respective mortise, said end of the cross-brace being crimped in the mortise by drawing said legs together.

* * * * *